Patented Sept. 10, 1940

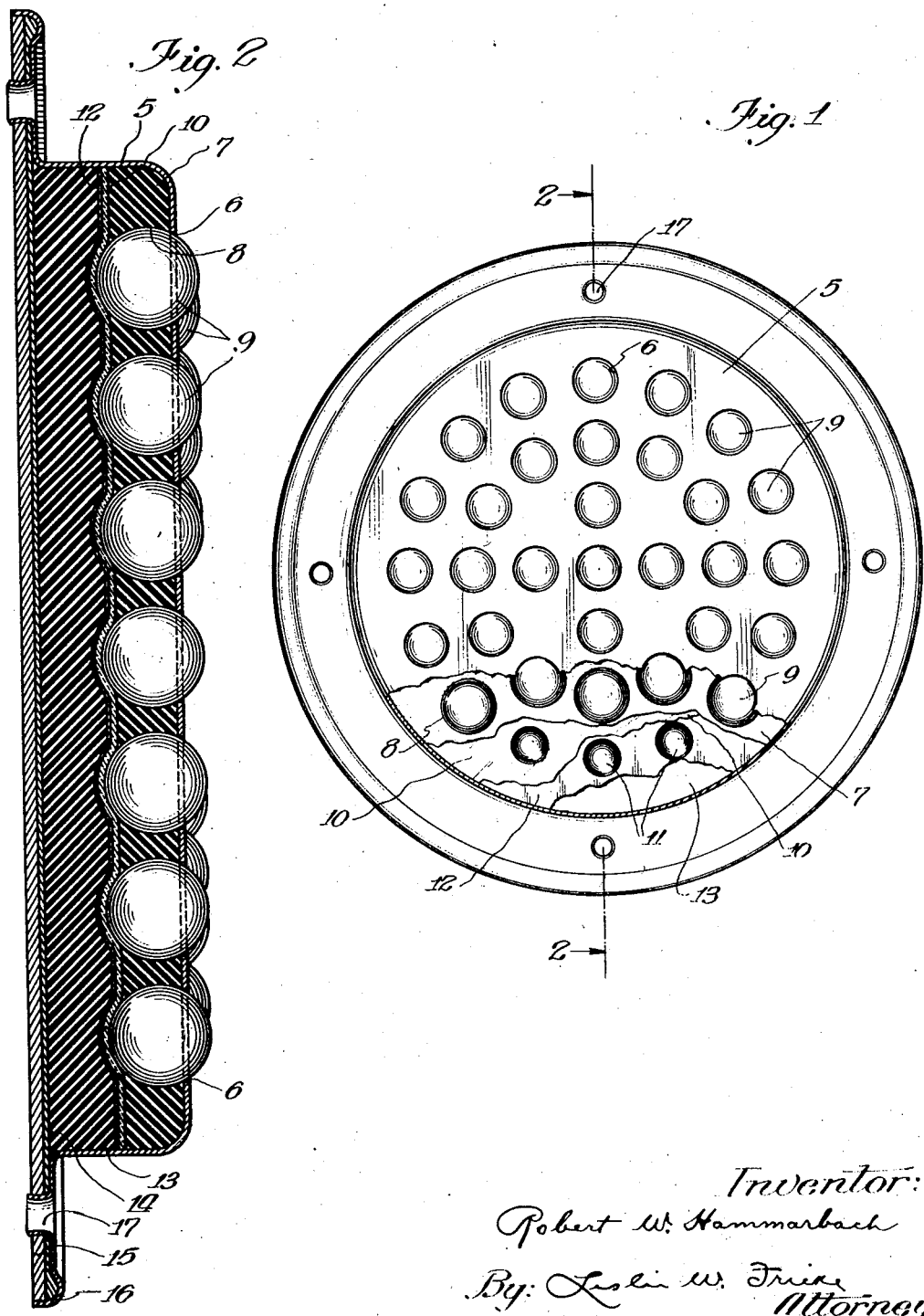

2,214,369

UNITED STATES PATENT OFFICE 2,214,369

REFLECTOR

Robert W. Hammarbach, Chicago, Ill., assignor to American Automatic Devices Co., Chicago, Ill., a corporation of Illinois Application January 30, 1939, Serial No. 253,583

2 Claims. (Cl. 88—82)

My invention relates to reflectors of the type disclosed in Patent No. 2,108,446, issued February 15, 1938, to Oliver C. Ritz-Woller.

It is one of the objects of my invention to provide a new and improved form and arrangement of parts whereby manufacture of the device may be facilitated and the cost of production substantially reduced.

Reflectors of this type usually comprise a plurality of substantially spherical lenses partially projecting through openings in the front wall of the casing with suitable reflecting means in rear of the lenses, the arrangement being such that oncoming light rays are reflected backwardly substantially to their source. In carrying out my invention, I provide a sheet of suitable transparent material of substantially uniform thickness, portions of which are shaped to conform to and are positioned at the rear surfaces of the respective lenses, the sheet being yieldably maintained against the rear surfaces of the lenses thereby serving, in combination with the front wall of the casing, to hold the lenses in operative position. It is another object of my invention to provide, at the rear of the transparent spacing or holding means, a thin sheet of suitable reflecting material such as aluminum foil whereby upon being pressed firmly against the rear surface of the transparent spacing means, by the yieldable means between it and the rear wall of the casing, the thin sheet of reflecting material will conform accurately to the surface of the transparent spacing means and function as a highly efficient reflector.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing—

Fig. 1 is a front elevational view of a reflector embodying the principles of my invention, certain portions thereof being broken away to disclose the internal construction; and Fig. 2 is a sectional view on an enlarged scale taken at the line 2—2 of Fig. 1.

Referring now to the drawing, in which corresponding parts are indicated by the same reference characters, it will be noted that the casing member 5 is formed of sheet metal and is provided in its front face with a plurality of circular openings 6. In rear of the front wall of the casing member I provide preferably a pad 7 of sponge rubber having a plurality of openings 8 therethrough registering with the openings 6 in the front face of the casing member. In lieu of sponge rubber the pad 7 may be of any other suitable material such as cork, or flexible rubber of a relatively dense nature. In the openings 8 of the pad 7 I have provided a series of substantially spherical lenses 9 of substantially greater diameter than that of the openings 8 whereby it is necessary to stretch the material of the pad about the openings for the insertion of the lenses into position. If a pad of rubber is employed, the pad is preferably molded complete with the openings 8 therethrough.

The lenses 9 are preferably formed of glass of the desired color being formed originally of substantially spherical form and being then given a high polish by any well-known method. The lenses 9 are very hard and are capable of withstanding a severe blow without breakage.

In the arrangement shown, I have provided at the rear of the pad 7 and at the rear of the respective lenses 9 a sheet 10 of substantially uniform thickness and of a suitable moldable material such as cellulose acetate, cellulose nitrate, polystyrene, methyl-methacrylate, or the like. The sheet 10 is molded with recesses or indentations 11 in positions corresponding to the openings 6 in the front wall of the casing, the recesses or indentations 11 being of the same curvature as the respective lenses so that a close fit between the rear surfaces of the lenses and the recessed portions of the sheet is obtained, as clearly shown in Fig. 2. In rear of the sheet 10, I have provided suitable reflecting means adapted under pressure of the assembled parts to conform closely to the rear surface of the sheet 10. Preferably the reflecting means is in the form of a sheet 12 of a suitable foil such as aluminum, tin, or tin and lead foil.

In the casing in rear of the reflecting means 12 I have provided a pad 13 of yieldable material such as sponge rubber or wool felt and of such thickness that it normally extends some little distance beyond the rear face of the casing member 5. In rear of the pad 13 I have provided a relatively thin sheet 14 of rubber or cork, and a metal plate 15 which are held in position with respect to the casing by means of a flange 16 carried by the casing, the flange 16 being connected with the plate 15 by means of rivets 17, which in the arrangement shown are in the form of integrally formed grommets. The arrangement is such that when the back plate 15 is placed into closure position the marginal portion of the sheet 14 acts as a gasket for providing a moisture-tight closure at the rear of the casing. The pad 13 is also substantially compressed so as to apply substantial pressure forwardly upon the thin sheet 12 and the spacing member 10 so as to bring the member 10 into tight engagement with the rear face portions of the lenses 9 whereby the pad 7 is compressed forwardly in addition to the compression produced laterally by the insertion thereinto of the lenses 9. The result is that an effective moisture-tight closure is produced between the front wall of the casing and the lenses 9.

Under the pressure of the assembled parts, the thin sheet of foil 12 is made to conform accurately and closely to the rear surface of the transparent sheet 10 with the result that those portions of the sheet 12 in rear of the lenses 9 are accurately disposed concentrically with respect to the lenses. When the parts are arranged as shown in the drawing rays of light entering any of the spherical lenses are reflected backwardly approximately to their source and the device as a whole is highly efficient for the purpose for which it is provided. The construction is such that a heavy blow can be applied to any of the lenses without breakage, the resilient mounting of the lenses being such as to cushion the blow and to prevent any substantial damage.

The materials for the sheets 10 and 12 are inexpensive. The sheet 10 may be readily molded to the desired shape and can therefore be produced easily and cheaply. No preforming of the sheet 12 is required. The assembly of the device can be effected rapidly by unskilled labor.

I do not intend to limit my invention to the details of construction shown and described except only in so far as certain of the appended claims are specifically so limited as it will be obvious that modifications may be made without departing from the principles of the invention.

I claim:

1. In a reflector of the class described, the combination of a casing having openings in its front wall portion, a lens having a forwardly tapered portion seated in each of said openings and of substantially greater size than that of the openings so as to be held by the wall portion in position with the major portion of the lens in rear of said front wall portion, means about the lenses for holding them in said positions, a sheet of molded transparent material having portions conforming to the surfaces of and positioned at the rear of said lenses, a sheet of reflecting foil at and conforming to the rear face of said transparent sheet and detached therefrom, and yieldable means compressed between the reflecting foil and the back wall of the casing for holding the lenses, the transparent sheet and the reflecting foil in operative position.

2. In a reflector of the class described, the combination of a casing having circular openings in its front wall portion, a substantially spherical lens seated in each of said openings and of substantially greater diameter than that of the openings so as to be held by the wall portion in position with the major portion of the lens in rear of said front wall portion, means about the lenses for holding them in said positions, a sheet of molded transparent material of substantially uniform thickness having portions conforming to the surface of and positioned at the rear of said lenses, a sheet of reflecting foil at and conforming to the rear face of said transparent sheet and detached therefrom, and yieldable means compressed between the reflecting foil and the back wall of the casing for holding the lenses, the transparent sheet and the reflecting foil in operative position.

ROBERT W. HAMMARBACH.